United States Patent
Davidson

(10) Patent No.: US 7,578,381 B2
(45) Date of Patent: Aug. 25, 2009

(54) PRODUCT CARRIER AND TRANSPORT DEVICE

(75) Inventor: Mats Ingvar Davidson, Gånghester (SE)

(73) Assignee: Eton Systems AB (SE)

( * ) Notice: Subject to any disclaimer, the term of this patent is extended or adjusted under 35 U.S.C. 154(b) by 236 days.

(21) Appl. No.: 10/572,346

(22) PCT Filed: Sep. 20, 2004

(86) PCT No.: PCT/SE2004/001349

§ 371 (c)(1),
(2), (4) Date: Jan. 17, 2007

(87) PCT Pub. No.: WO2005/028342

PCT Pub. Date: Mar. 31, 2005

(65) Prior Publication Data

US 2007/0193857 A1    Aug. 23, 2007

Related U.S. Application Data

(60) Provisional application No. 60/481,404, filed on Sep. 22, 2003.

(30) Foreign Application Priority Data

Sep. 22, 2003 (SE) .................................... 0302541

(51) Int. Cl.
*B65G 47/10* (2006.01)
*B65G 47/46* (2006.01)

(52) U.S. Cl. ............................... 198/370.04; 198/678.1

(58) Field of Classification Search ............ 198/370.04, 198/465.4, 803.7, 456, 700, 678.1, 680, 681; 104/89

See application file for complete search history.

(56) References Cited

U.S. PATENT DOCUMENTS

| 2,968,257 | A | * | 1/1961 | Schreyer | 105/150 |
| 3,443,526 | A | * | 5/1969 | Gee | 104/96 |
| 3,759,190 | A | | 9/1973 | Harvey | |
| 3,854,573 | A | * | 12/1974 | Freier, Sr. | 198/687.1 |
| 4,073,237 | A | * | 2/1978 | Wakabayashi | 104/172.5 |
| 4,280,411 | A | * | 7/1981 | Katayose et al. | 104/112 |
| 4,817,778 | A | | 4/1989 | Davidson | |
| 4,936,222 | A | | 6/1990 | Murai | |
| 5,364,469 | A | * | 11/1994 | Wakabayashi | 118/423 |
| 5,829,356 | A | * | 11/1998 | Christiansson | 104/167 |
| 5,829,575 | A | | 11/1998 | Williams | |
| 6,966,431 | B2 | * | 11/2005 | Jaynes et al. | 198/817 |

FOREIGN PATENT DOCUMENTS

| DE | 195 17 832 C1 | 12/1996 |
| SU | 854825 B | 8/1981 |

* cited by examiner

*Primary Examiner*—Gene Crawford
*Assistant Examiner*—William R Harp
(74) *Attorney, Agent, or Firm*—Lerner, David, Littenberg, Krumholz & Mentlik, LLP

(57) ABSTRACT

Product carrier, moveable along a conveyor track (33, 34) in a conveyor arrangement, and designed as a trolley, which has two wheel units (3, 4) which are moved along the conveyor track. Suspended from each wheel unit is a carrier arm (5, 6) for the products that are to be conveyed. The carrier arms (5, 6) are connected to one another by means of a positioning mechanism (9), which maintains a selected essential distance (a) between the wheel units (5, 6) regardless of the inclination of the track.

9 Claims, 11 Drawing Sheets

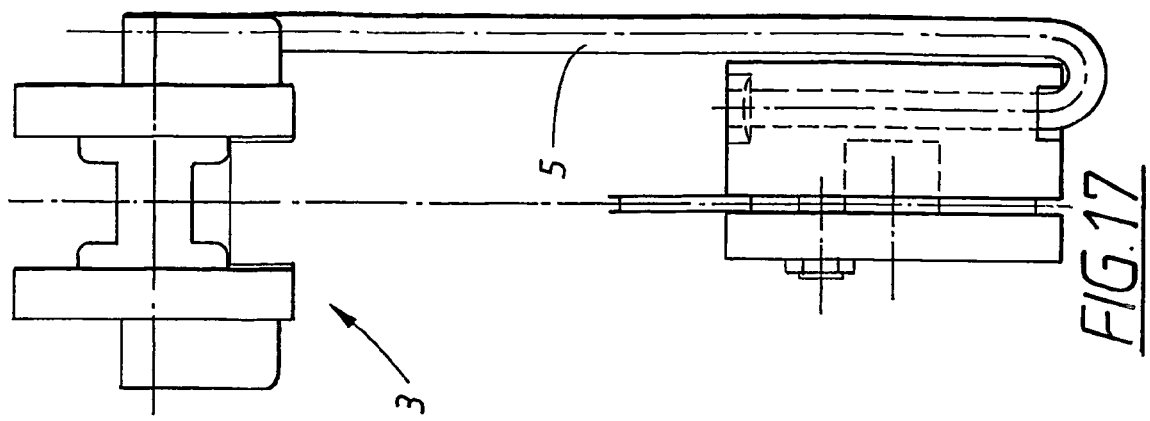
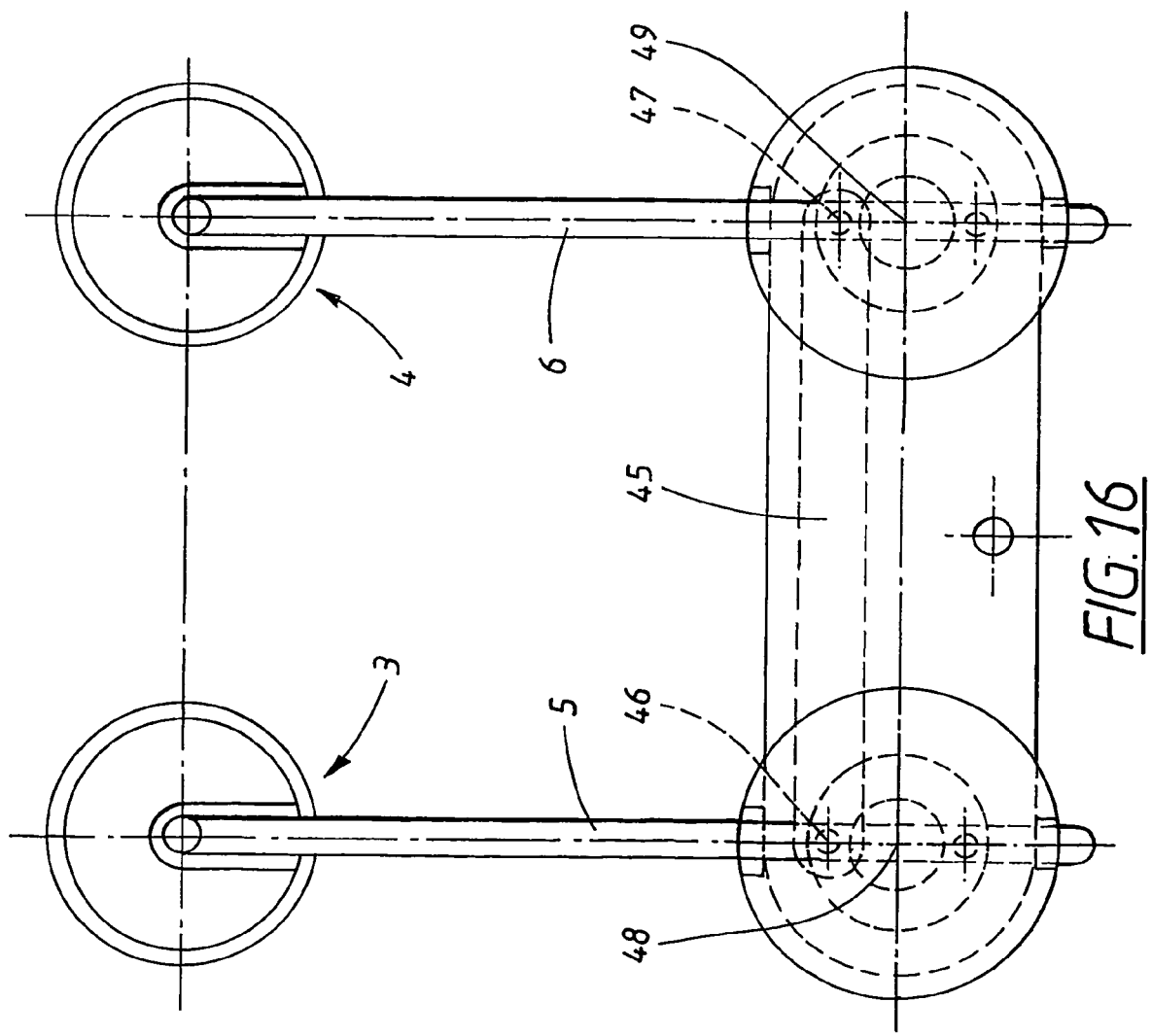

PRODUCT CARRIER AND TRANSPORT DEVICE

CROSS-REFERENCE TO RELATED APPLICATIONS

The present application is a national phase entry under 35 U.S.C. §371 of International Application No. PCT/SE04/01349 filed Sep. 20, 2004, published in English, which claims the benefit of the filing date of U.S. Provisional Patent Application No. 60/481,404 filed Sep. 22, 2003, the disclosure of which is hereby incorporated herein by reference.

FIELD OF THE INVENTION

The present invention relates to a product carrier, moveable along a conveyor track in a conveyor arrangement, and designed as a trolley, which has at least two wheel units which are designed to be moved along the conveyor track, and a carrier arm which is suspended from each wheel unit and which is provided with carrier members for the products that are to be conveyed.

The present invention also relates to a conveyor arrangement comprising a first conveyor and at least a second conveyor together with a number of product carriers designed as trolleys which are moveable along the conveyors for moving products, the first conveyor comprising a continuous track, and the trolleys having wheel units designed to run along the track, and the second conveyor comprising a chain conveyor in the form of a loop of links designed with members for receiving and holding during transport of the trolleys, said holding members being situated at a selected spacing interval from one another.

BACKGROUND OF THE INVENTION

Arranging so-called suspension conveyors for conveying separate objects is known in the art, see U.S. Pat. No. 4,817, 778 A, for example. This comprises a number of conveyor tracks along which product carriers move. Each product carrier comprises a trolley and suspended carrier members for the object in question. For conveying larger objects or more than one object on the same carrier, the conveyor track and the trolley may be endowed with larger dimensions or the trolley may comprise more than one wheel unit. Using more than two wheel units per trolley, for example, may make it possible to use one and the same conveyor track with both lighter objects that are carried by one wheel unit per product carrier, and heavier objects using multiple wheel units. When using multiple wheel units, however, problems can arise on inclined sections of the track in that the load may become unevenly distributed between the wheel units. The trolley being of a suitably articulated construction, the interval between the wheel units may vary, which creates problems, particularly at the transition between conveyor tracks, for example for conveyor chains.

SUMMARY OF THE INVENTION

The object of the present invention is to eliminate the aforementioned disadvantages in conveying more than one object or heavier objects in one and the same product carrier.

Said object is achieved by means of a product carrier which is characterized in that the carrier arms are connected to one another by means of a positioning mechanism, which maintains a selected essential distance between the wheel units regardless of the inclination of the track.

Said object is also achieved by means of a conveyor arrangement which is characterized in that the wheel units have suspended carrier arms which are connected to one another by means of a positioning mechanism for maintaining a selected positional relationship between the wheel units, so that the wheel units on the whole maintain an axial distance from one another which largely corresponds to said spacing interval.

By means of the carrier and the conveyor arrangement according to the invention a specific distance and also an even load distribution is achieved between the wheel units, which provides a secure and stable conveying function and facilitates the transition between different types of conveyor tracks.

DESCRIPTION OF THE DRAWINGS

The invention will be explained in more detail below by some exemplary embodiments and with reference to drawings attached, of which FIGS. 16 and 17 are a side view and an end view respectively of the product carrier in a second embodiment, while

DESCRIPTION OF THE PREFERRED EMBODIMENTS

Figure 2:
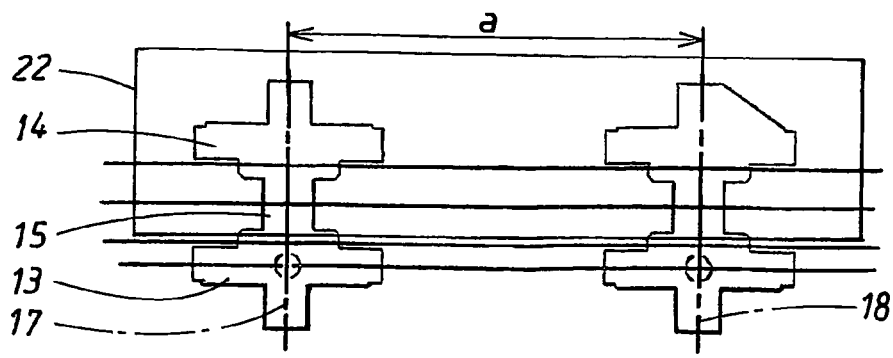
FIG. 2 is a plan view of the carrier according to FIG. 1 situated on a straight section of a conveyor track.

The construction of the product carrier 1 according to the first embodiment will first be described with reference to FIGS. 1 to 4. This forms part of a conveyor arrangement which also includes a conveyor track 2, along which the product carrier is intended to move in order to move products between different positions along the track. This is indicated only schematically in FIGS. 1 and 2. The product carrier is designed as a trolley having two wheel units 3, 4, which constitute the connection between the trolley and the conveyor track. Suspended from each wheel unit is a carrier arm 5, 6, to which one or more carrier members 7, 8 are coupled for carrying products along the conveyor track 2. In the example shown the carrier members are designed as a number of loops 7 for hangers, shackles or clips and/or a suspended, pivotally supported hook 8.

According to the invention the carrier arms 5, 6 are connected to one another by a mechanical positioning mechanism 9 arranged in a holder 10, in which the carrier arms 5, 6 are pivotally supported. The holder 10 supports the carrier members 7, 8. The positioning mechanism 9 consists of a parallel guide mechanism which is designed to permanently maintain a largely constant angular relationship between the carrier arms 5, 6, and thereby also a specific axial distance a between the wheel units 3, 4, but with minor variations, as will be explained in more detail below. The mechanism also maintains an unaltered angular relationship, in the example a parallel relationship, between the connecting axis 11 of the wheel units on the one hand and the axis of symmetry 12 of the holder on the other, viewed in the plane of projection according to FIG. 1. Each wheel unit 3, 4 comprises two rollers 13, 14 situated with an interval between them, the rollers in the example shown being rigidly connected to one another by means of a waist section in the form of an axle casing 15. The rollers and the axle casing 15 are supported so that they can rotate about a shaft 16, which is firmly connected to each carrier arm 5, 6 and in practice may comprise a curved section of the carrier arm, which is advantageously made, for example, of metal such as a steel rod, light alloy rod or light alloy tube, whilst other parts of each wheel unit are made of a high-strength plastic material. The rollers 13, 14 are designed to run in a roller track which is formed by the conveyor track 2 and is in practice formed as a profile, as shown in FIG. 2, as a straight section of the conveyor track, the geometric axes of rotation 17, 18 of the wheel units, which are formed by the shaft 16, being parallel to one another.

The parallel guide mechanism 9 according to the first embodiment comprises a gearwheel mechanism having three gearwheels 19, 20, 21 rotatably supported in the holder. Of these, the two outer gearwheels 19, 20 intermesh with an intermediate gearwheel 21, the outer gearwheels having the same diameter as one another and each being connected to one of the carrier arms 5, 6, so that they are turned together by swiveling movements of the carrier arms in the plane of projection according to FIG. 1. In practice the carrier arms are at the bottom bent at right angles into a through-hole in the two outer gearwheels, in order to robustly transmit the load from the products carried via the carrier members 7, 8 and via the arms to the wheel units 3, 4. The fact that the carrier arms 5, 6 are at the top suspended and articulated in the wheel units 3, 4 and are firmly articulated in the holder 10 by way of the gearwheels 19, 20 allows them to perform a coordinated oscillating movement, which will be described in more detail below. It will furthermore be seen from FIG. 1 to 3 that the holder 10 is designed as a box-shaped housing with broad, transverse essentially plane end walls 22, 23, which form stop surfaces or buffers when lining up multiple trolleys in one conveyor arrangement.

Figure 1:
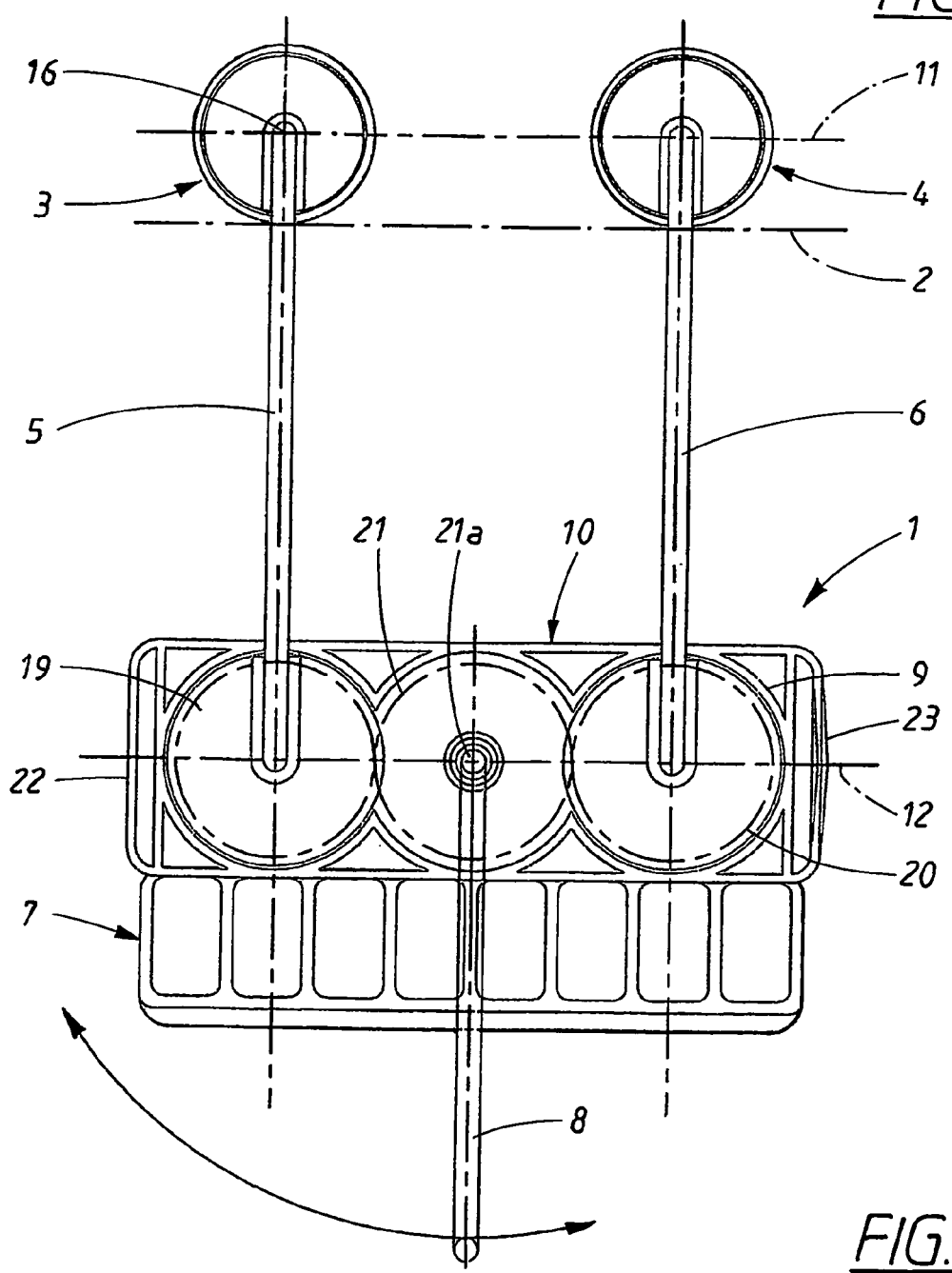
FIG. 1 is a side view of a first embodiment of a carrier for objects.
Figure 3:
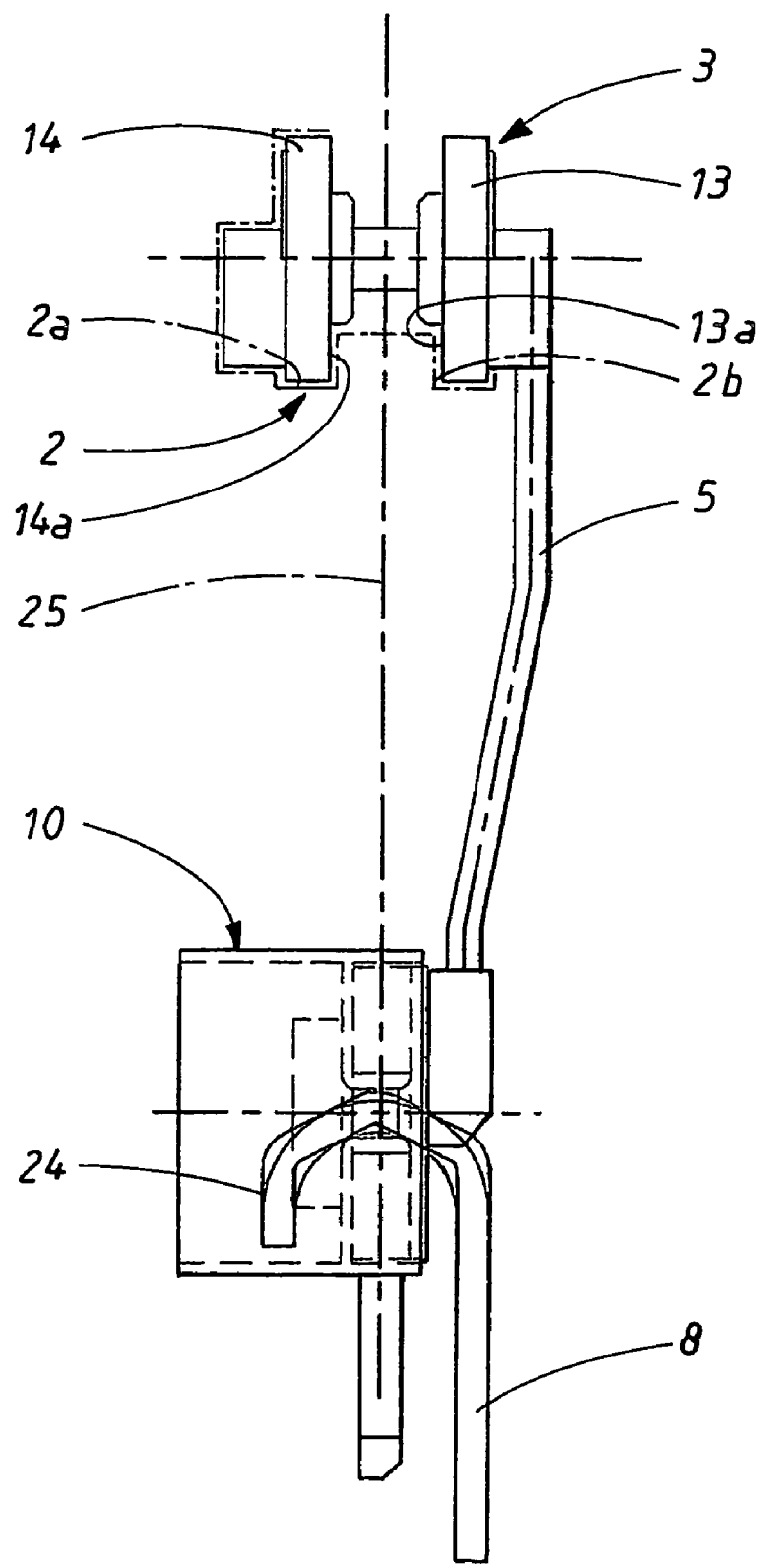
FIG. 3 is an end view of the carrier according to FIG. 1, FIG. 4-7 show different views of parts of the carrier according to the first embodiment.

It will be seen from FIGS. 1 and 3 that the one carrier member 8 in the form of a hook 24 is suspended in a central hole 21a in the intermediate gearwheel 21. The carrier member 8 is advantageously intended for heavier objects, and at its bottom end may have a holding arrangement for objects, for example a hook or clip. FIG. 3 furthermore shows that the carrier arms 5 (the carrier arm 6 is hidden) are angled off from a straight vertical line, so that the center of gravity of the load ends up symmetrically in a vertical line of symmetry or a plane of symmetry 25.

It will be seen from FIGS. 2 and 3 that in addition to the roller track 2a for each roller 13, 14 the conveyor track also comprises lateral guide tracks 2b, which interact with one side face 13a, 14a of each roller in order to position the wheel units 3, 4 in the track.

Figure 4:
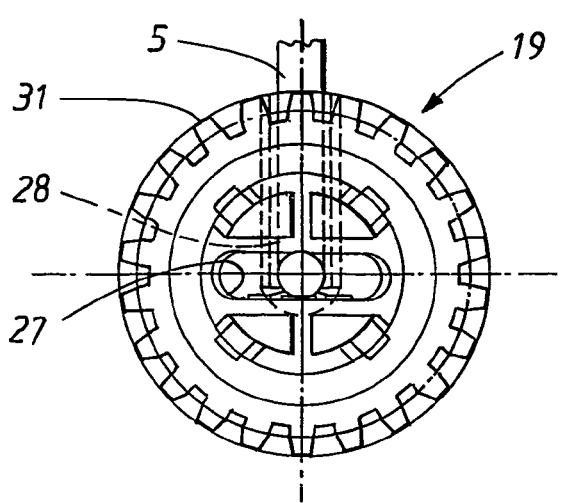
Figure 5:
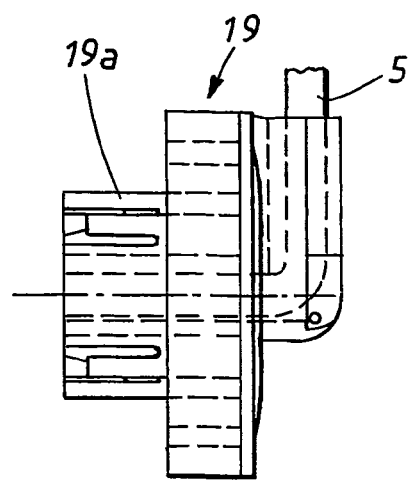
Figure 6:
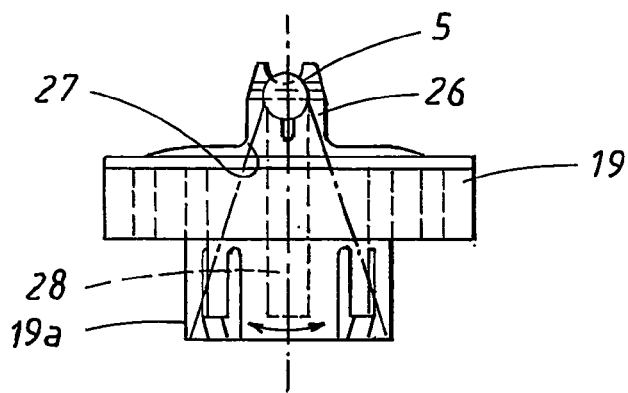
Figure 7:
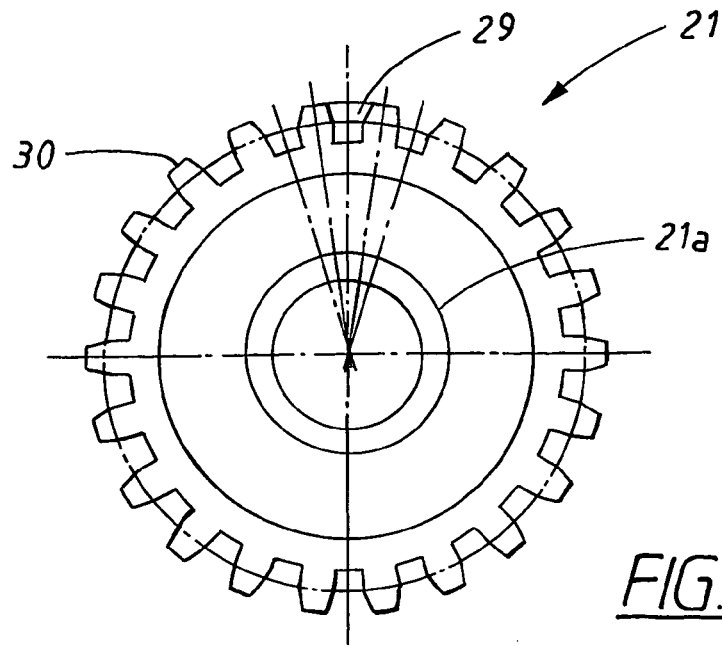

FIG. 4 to 7 show a practical embodiment of the outer gearwheels 19, see FIGS. 4 to 6, and of the intermediate gear, see FIG. 7. It will be seen from FIGS. 5 and 6 that the outer gearwheels have a drive member 26 in which the lower end of each carrier arm 5, 6 is held and which drives the gearwheel in the swiveling movement of the carrier arm about its wheel unit. It will further be seen that the outer gearwheels 19 have a specially shaped central opening 27, in which the bent-over end section 28 of the carrier arm 5 pushes. More specifically, the opening is essentially circular at the end where the carrier arm is inserted, but widens out conically viewed in a plane at right angles to the main extent of the carrier arm. This makes it possible for the end section 28 of the carrier arm to move within a specific angular range, in order to allow the two carrier arms to twist essentially about their own longitudinal axis, so as to permit turning of the wheel units when cornering on a curved section and variation of the axial distance a, within narrow limits, see below. The gearwheels 19-21 moreover have bearing sections 19a, 21a for rotatable support in corresponding sections in the holder 10. Also visible from FIG. 7 is a restriction of the turning movement of the gearwheels in that one of the gearwheels, in the example shown the intermediate gearwheel 21, has a locked section 29 along its toothed 30 periphery, so that at the point of contact with one or the other outer gearwheel 19, 20 intermeshing engagement is prevented for the teeth 31 of the outer gearwheel. This limits the parallel movement to somewhat less than 180°, in order to prevent locking in the limit positions. Such restriction of the limit position can be achieved in a number of other ways, for example by means of stop sections on the carrier arms 5, 6.

Figure 9:
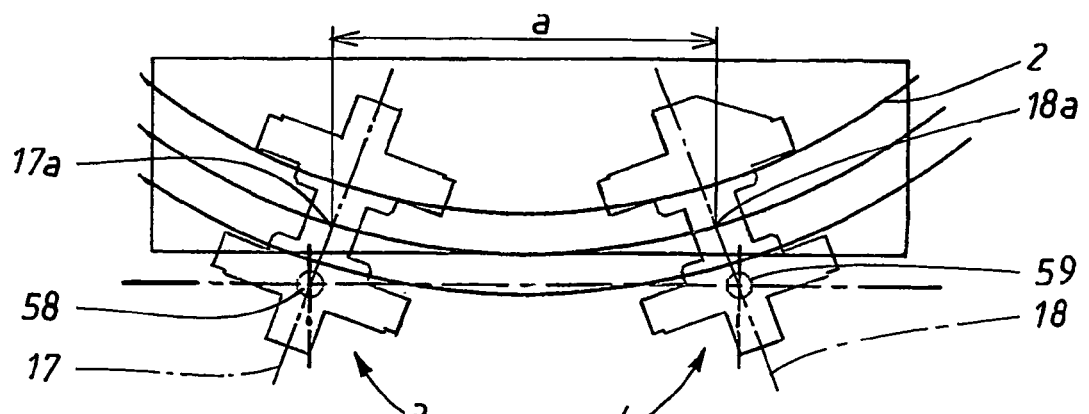
FIGS. 8 and 9 show views of the product carrier corresponding to the views according to FIGS. 1 and 2, but with the carrier on a first curved section of the conveyor track.
Figure 8:
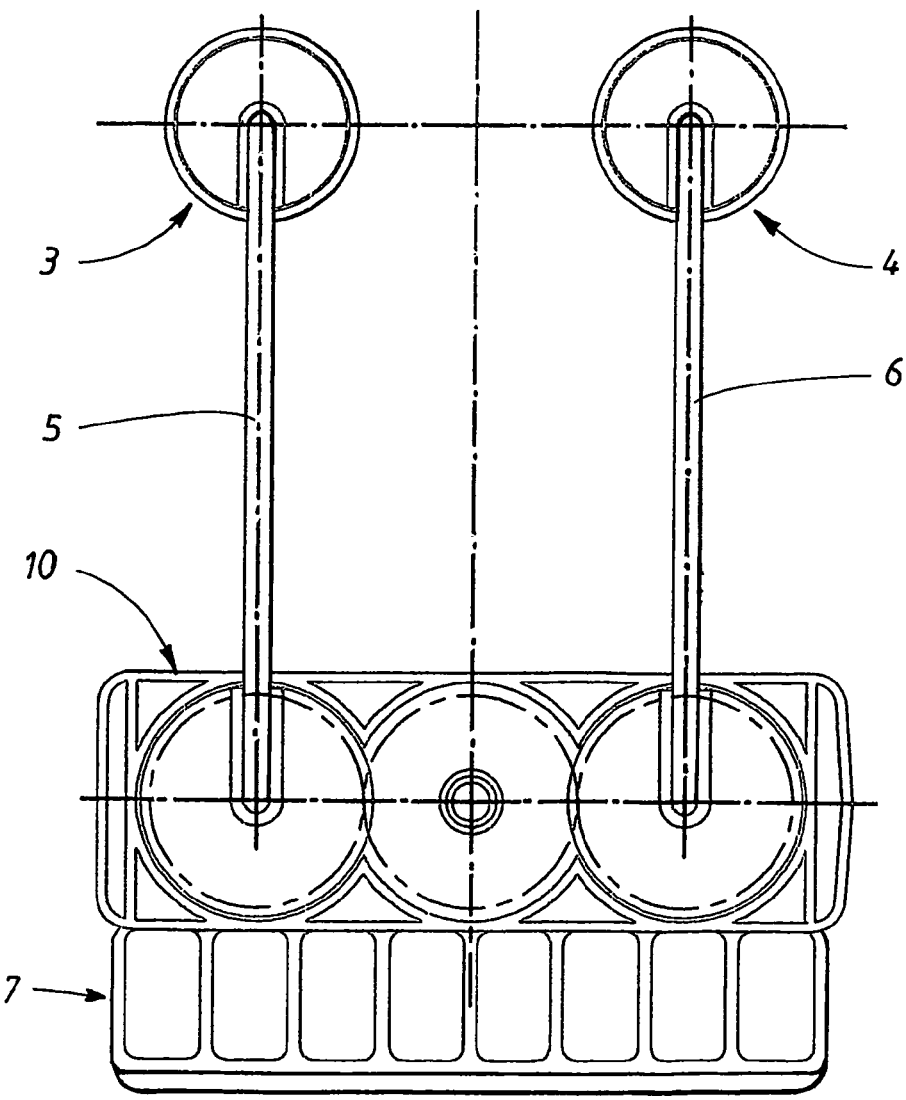

FIGS. 8 and 9 show a situation in which the product carrier 1 is situated on a curve of the conveyor track 2 of the conveyor arrangement. The fact that the carrier arms 5, 6 are allowed, as described above, to twist within a certain range about their longitudinal axis means that the two carrier wheels 3, 4 can be angled, that is to say their axes of rotation 17, 18 are able to deviate to a relatively large extent from a position in which they are parallel with one another, partly for cornering on this track and partly to allow a minor adjustment of the axial distance a, in FIG. 9 a small reduction of a. The distance a here relates to the distance between the axes 17, 18 at their symmetrical midpoint 17a, 18a on the axle casing 15.

Figure 11:
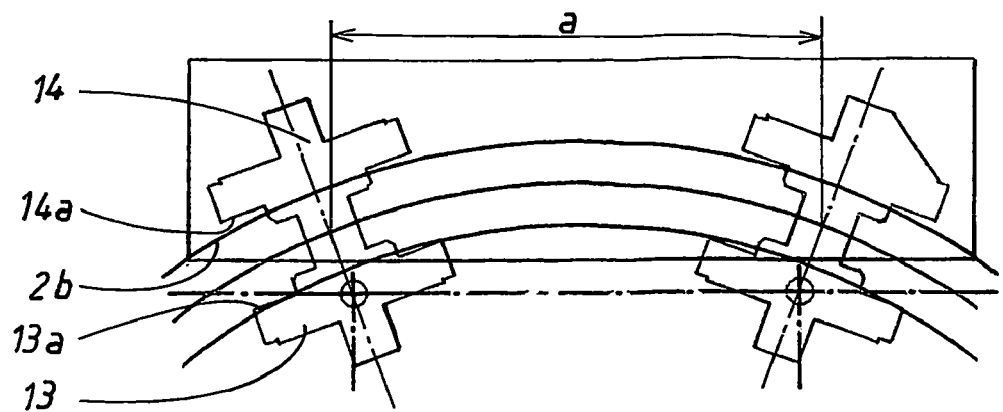
FIGS. 10 and 11 show similarly corresponding views, but with the carrier on a second curved section of the conveyor track, in which the carrier bends in the opposite direction.
Figure 10:
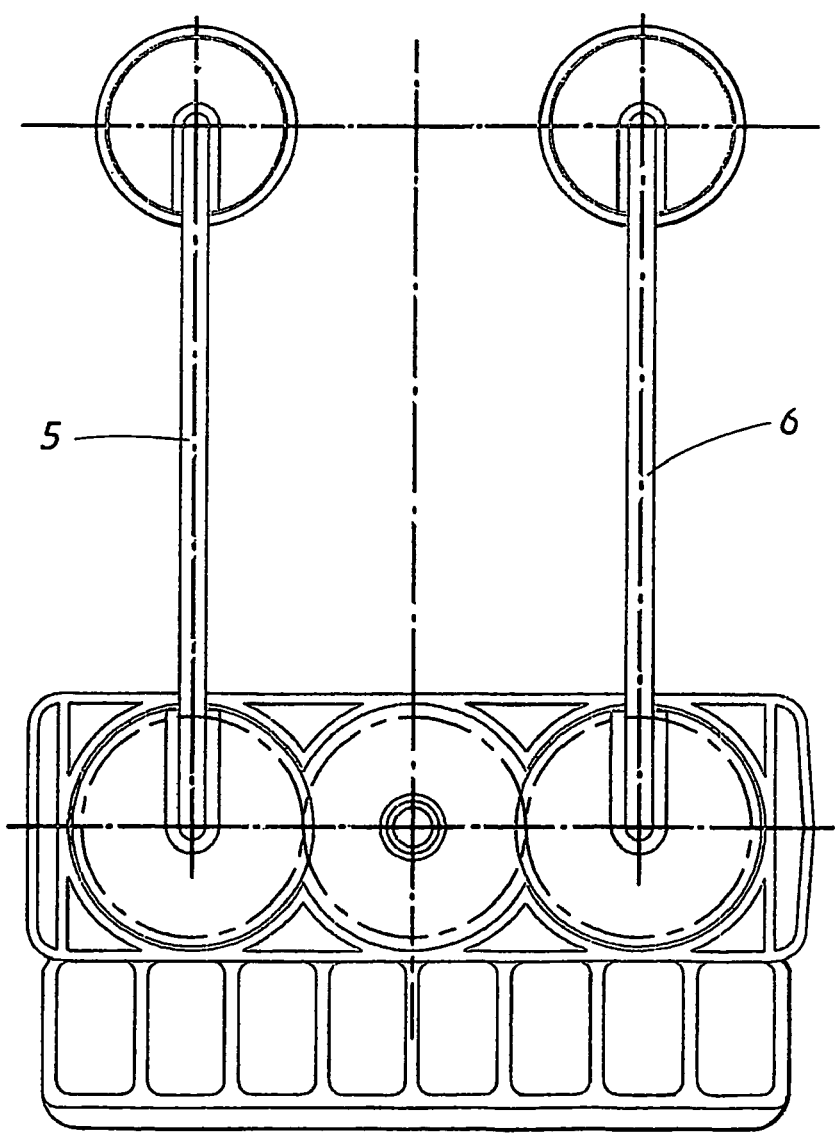

As FIGS. 10 and 11 show, a corresponding angling of the axes of rotation 17, 18 of the wheel units in an opposite direction is permitted when cornering on a curve in the opposite direction. In both cases the pivot center 58, 59 for the axes of rotation 17, 18 lies outside the center of symmetry of the wheel units 3, 4, which gives the modified axial distance, which is important in conveyors of the chain conveyor type, see below.

This turning of the wheel units 3, 4, which can be seen from FIGS. 9 and 11, is achieved through the interaction of the conveyor with its guide faces 2b guiding against the side faces 13a, 14 of the rollers.

Figure 12:
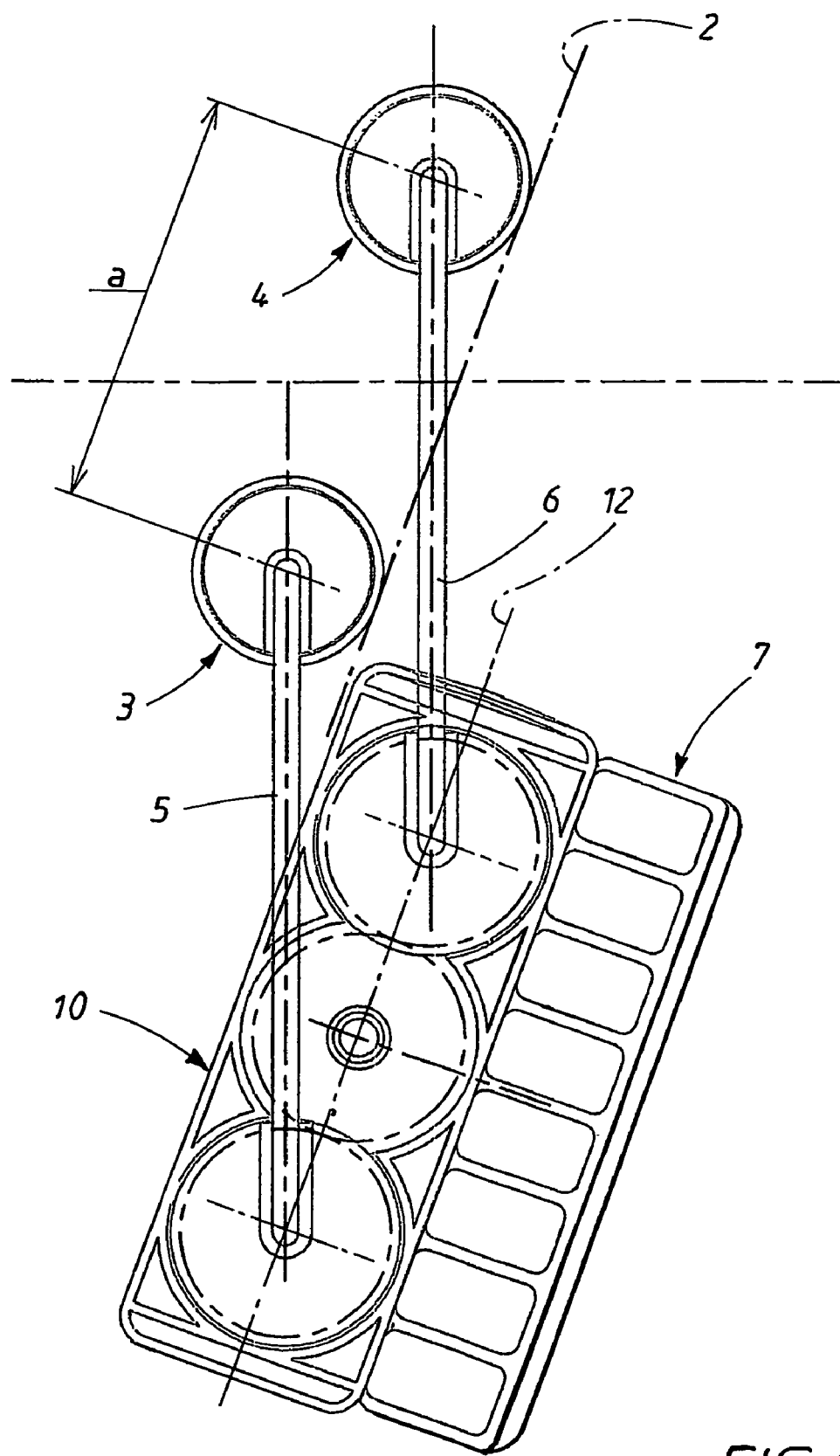
FIGS. 12 and 13 show side views of carriers in different inclined positions on the conveyor track.

FIG. 12 shows the parallel function of the product carrier according to the invention on a steeply inclined section of the conveyor track 2. The parallel function serves to keep the carrier arms 5, 6 in an unaltered angular position relative to one another, in the example essentially parallel to one another, which affords a retained center-to-center distance a between the wheel units 3, 4. Furthermore, the axis of symmetry 12 of the holder is substantially parallel to the track 2 even on an inclined section. A controlled relative position of the holder 10 and the carrier members 7 is thereby obtained at all times, which gives an even load distribution of the carrier arms 5, 6 and the wheel units 3, 4. The end walls 22, 23 are thereby turned in the direction of the conveyor track, with the result that in a queue of product carriers the end walls are turned towards one another and thereby function as buffers with no risk of getting caught between the trolleys.

Figure 13:
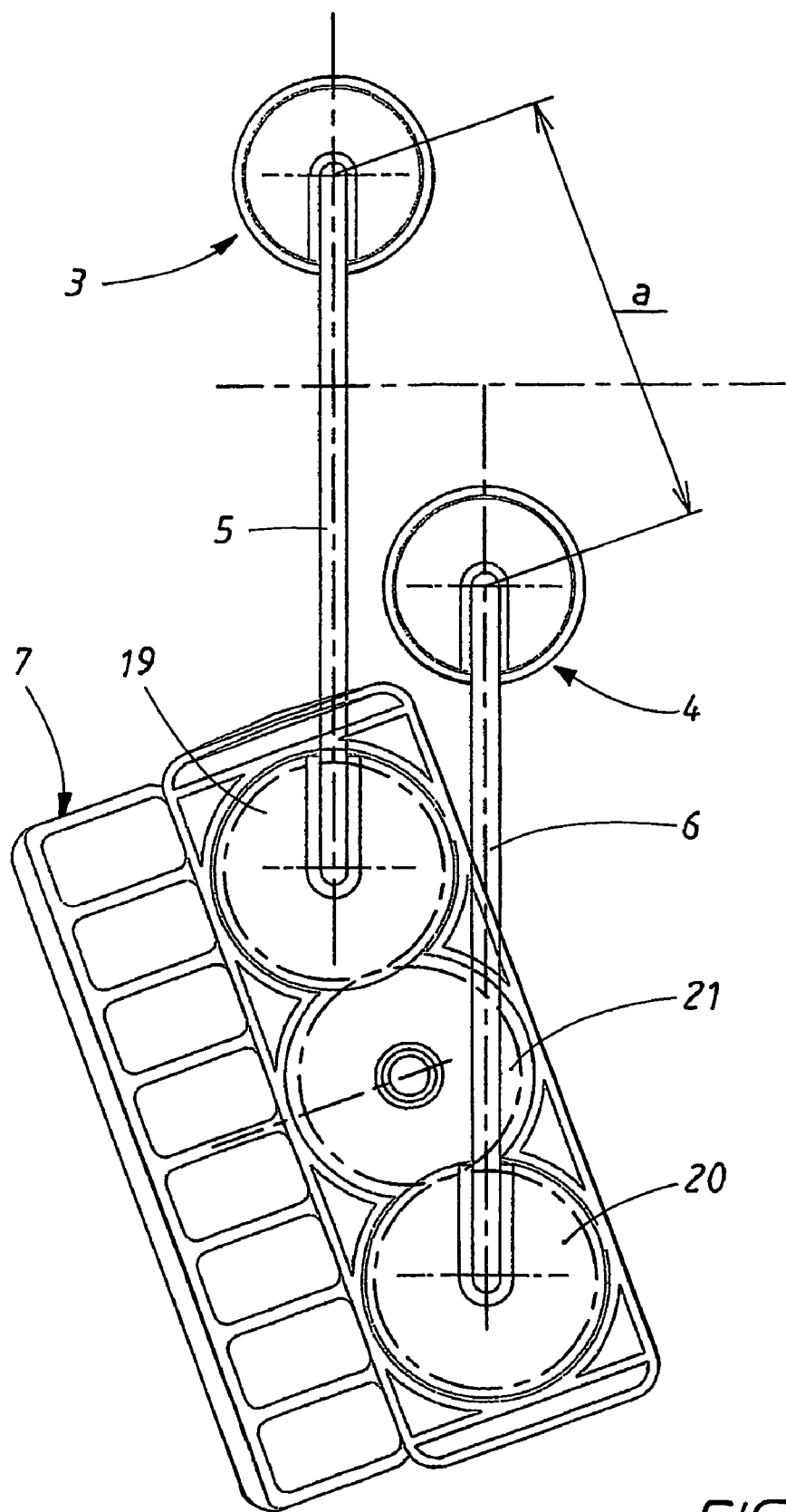

FIG. 13 shows how the product carrier on a reverse incline is adjusted whilst retaining the essential parallelism between the carrier arms 5, 6 in that the outer gearwheels together intermesh with the intermediate gearwheel 21 and maintain the axial distance a between the wheel units 3, 4.

Regardless of the direction of the incline and the degree of inclination, the permanent intermeshing engagement with the intermediate gearwheel 20 keeps the outer gearwheels 19, 21 constantly in the same turning position relative to one another that produces the unaltered axial distance a.

Figure 14:
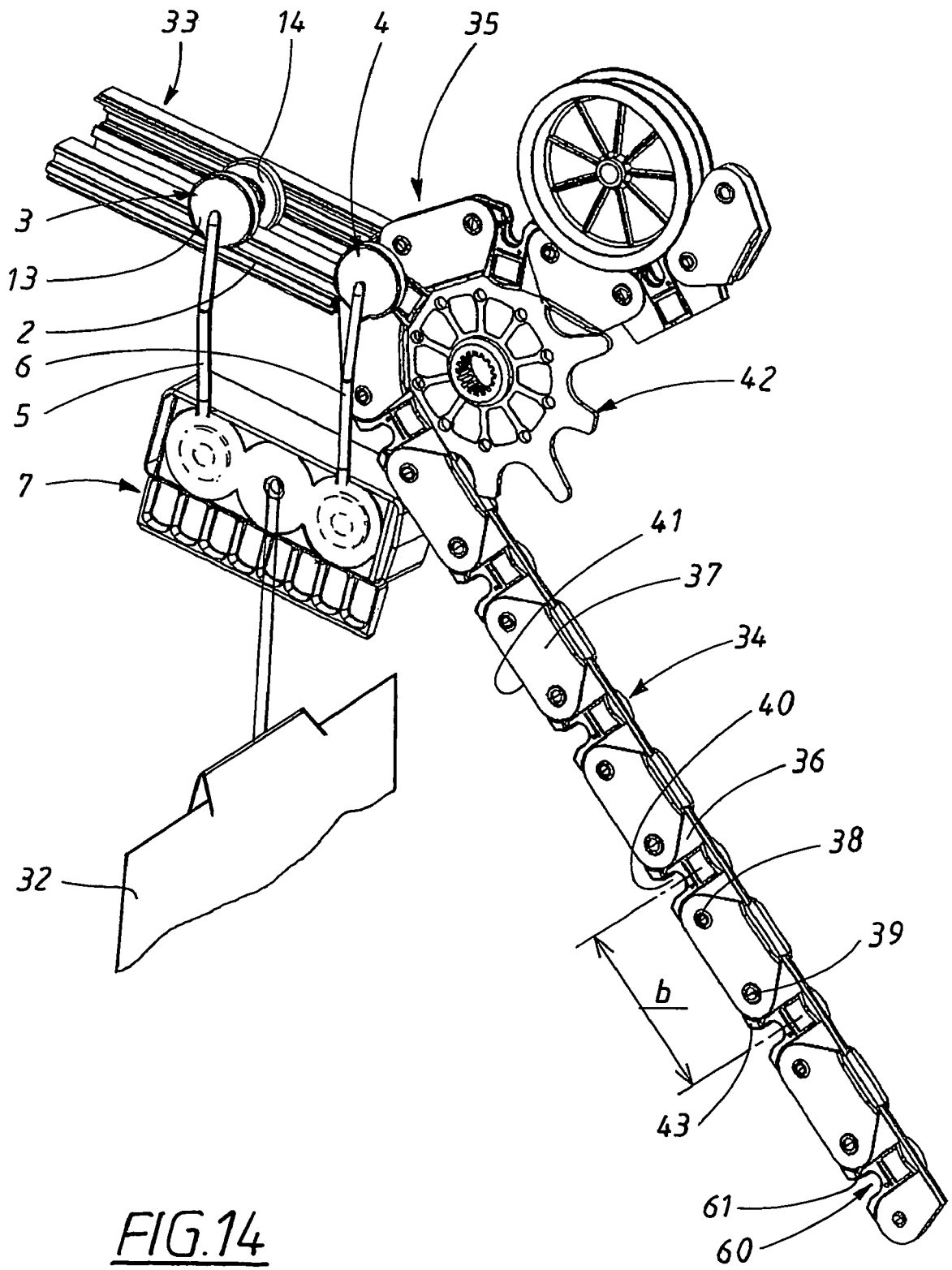
FIG. 14 is a perspective view of a part of a conveyor arrangement with a carrier according to the invention.

FIG. 14 shows a section of a conveyor arrangement or installation for conveying products, which may be all conceivable types of objects, for example mats 32. The conveyor arrangement may be of a type, for example, in which a plurality of trolleys 1, only one of which is shown, are conveyed along a main line (not shown) up to a number of branch lines 33, 34, only one of which is shown, where the trolleys are switched over to each branch line for specific treatments in a work station, before being brought back to the main line. An example of such an installation is disclosed by U.S. Pat. No. 4,817,778 A.

From the main line the product carriers 1 are switched to the branch line, which in the example comprises two types of conveyor 33, 34 and a transfer unit 35 for transferring the trolleys from one conveyor 22 to the other conveyor 34. In the example shown the one comprises the aforementioned roller track in the form of a suitably shaped profile section as previously described, which forms rolling surfaces for the rollers 13, 14 of the wheel units 3, 4 and guide faces for lateral guiding of the rollers. The second conveyor 34 in the example shown comprises a conveyor chain, which in an advantageous example may have the same construction as in the earlier patent specification, suitably in the form of a closed loop. In the example therefore, the conveyor chain comprises a plurality of links 36, 37, which by way of joint pins 38, 39 are articulated to one another for an articulated movement or swivel movement in a specific plane, but are guided by interacting slide surfaces so that reciprocal movement between the links in other planes is minimized. The links consist of two types, which will hereinafter be referred to as carrier links 36 and intermediate links 37. The chain conveyor 34 is designed to receive and to hold the transported and stationary trolleys and to deliver them through interaction with their wheel units in a known manner according to the earlier patent specification. For this purpose the carrier links have holding members or driver members, which are designed to receive and to hold the transported wheel units 3, 4 of the trolleys and to deliver them. In the example shown these holding members comprise openings 40, which in a release position are open to the outside, but in the holding position, that is to say in the conveying position or when the conveyor is stationary at a work station, for example, ensure holding by means of a catch 60. In practice the carrier links in the vicinity of the opening are of a width smaller than the interval between the rollers of the wheel units, that is to say the length of the axle casing 15, so that the wheel unit is held between the rollers 13, 14 with a clearance, which allows the wheel units 3, 4 to be angled somewhat by the aforementioned torsion of the carrier arms 5, 6.

In the example shown the first conveyor 33 on the branch line is inclined downwards towards the loading unit 35 and is open towards a third conveyor. The front wheel unit 4 of the trolley is held stationary by the longitudinal edge 41 of the intermediate links, which forms a stop edge against the front wheel unit 4, until the chain conveyor by means of its drive wheel 42 runs around its periphery so that the opening 40 of the next carrier link 36 comes to rest directly opposite the front gripping section of the front wheel unit, that is to say the axle casing. The locking mechanism 60 for the opening 40 is thereby switched to the open position, that is to say the release position so that the gripping section of the wheel unit rolls into the opening and is carried by the movement of the chain conveyor. For example, the locking mechanism 60 is spring-loaded, so that it strives to block the opening by means of a catch 61. When the axle casing 15 from outside strikes against an edge of the catch, the latter is moved aside and the wheel unit can be received and held.

In a delivery unit, which is not shown, each product carrier is delivered to a roller track, the catch being opened through activation.

The wheel units 3, 4 of the trolley are positioned at an axial distance a from one another, which is selected so that it corresponds to the spacing interval b of the holding members on the carrier links, that is to say the openings. In the example shown this is equal to the distance between the nearest links, but in principle the distance may be a multiple of the distance between the carrier links. It will also be seen from FIG. 14 that, within certain limits, the parallel function creates a predefined axial distance a, that is to say the distance between the axes 17, 18 in the wheel units, irrespective of the inclination of the conveyor track 2. As has been described above, this applies on straight, that is to say linear sections of the roller track 2, for which reason the first conveyor 33 is straight in its section closest to the loading unit. This means that the selected interval is precisely maintained so that the wheel units can be brought into openings 40 in the conveyor chain one at a time in the correct position. The trolley as a whole and the holder 1 with the carrier members 7 furthermore acquire a controlled position in that the trolley as a whole at all times maintains a geometric pattern in the form of a parallelogram having different angles depending on the inclination of the conveyor track. In curved sections of the chain the spacing interval b is temporarily reduced, the axial distance a of the wheel units being adjusted accordingly due to the holding in the openings 40, and the torsion of the carrier arms 5, 6 described above. The holding of the wheel units 3, 4 is in fact adjusted with some play in order to permit this torsion.

Figure 15:
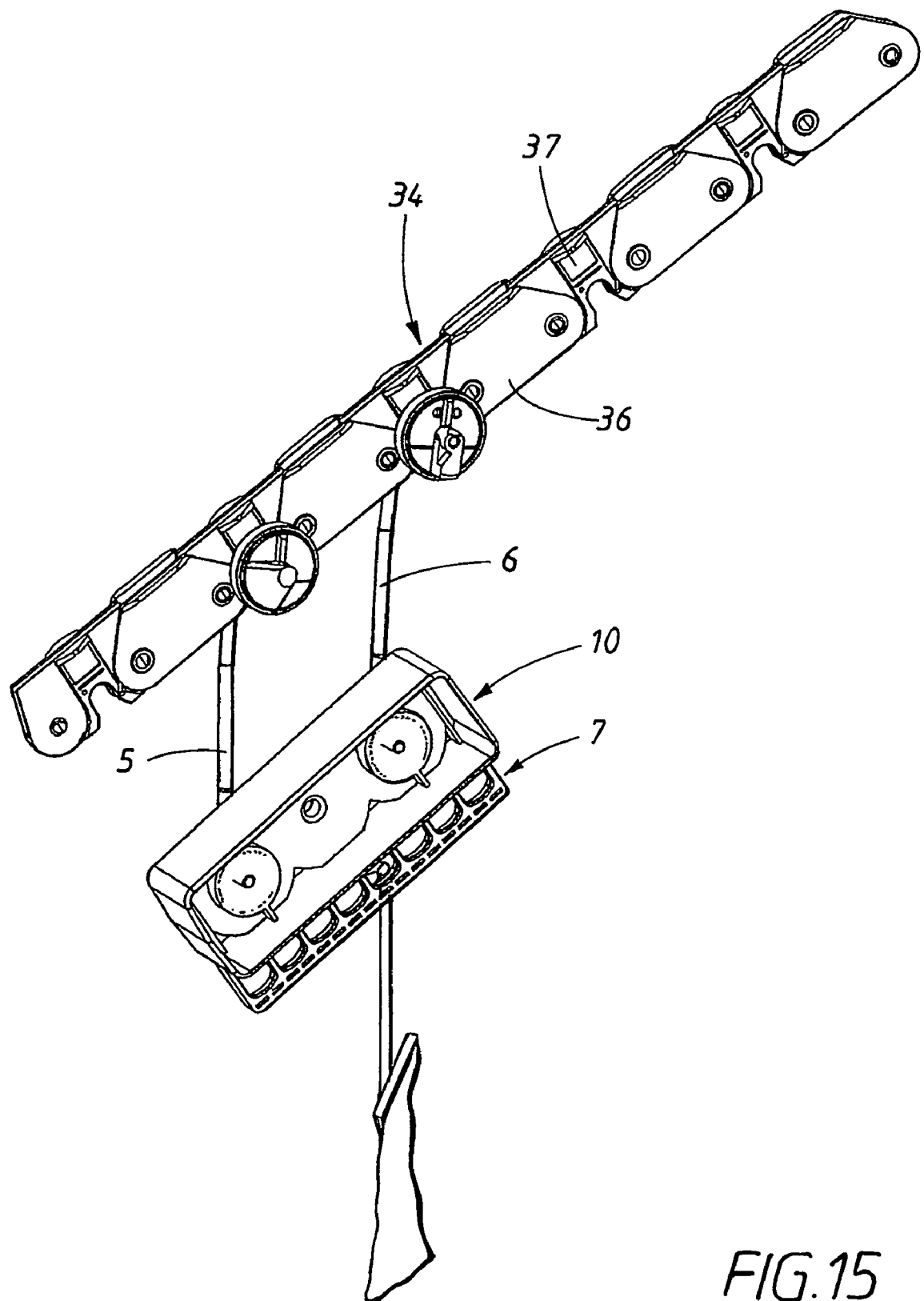
FIG. 15 is a perspective view of the conveyor arrangement with the carrier situated on another part of the track.

FIG. 15 shows one of the trolleys 1 in a position in the conveyor chain with the wheel units held in the openings 40 and the carrier arms 5, 6 parallel, so that the trolley as a whole is thereby in a controlled position with the holder 10 and the string of carrier members 7 parallel to the main extent of the conveyor chain, which gives an even load distribution between the wheel units 3, 4.

FIGS. 16 and 17 show the positioning mechanism in a second embodiment in which the gearwheel mechanism is replaced by a parallel arm 45, which connects the two carrier arms 5, 6 together by articulations 46, 47 situated at the same eccentric distance from the pivot center 48, 49 of the carrier arms. In order to facilitate the bearing in the holder, circular wheel-like elements are provided, which may have the same construction as the outer gearwheels 19, 20 but without toothing. In other respects the trolley may have the same construction as in the first embodiment, with the same facility for torsion of the carrier arms 5, 6 about their longitudinal axis.

Figure 19:
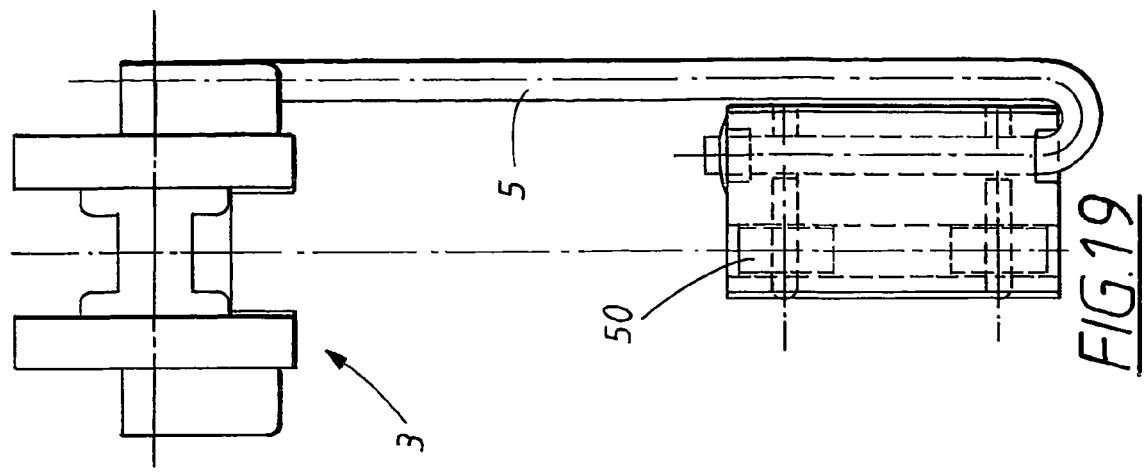
FIGS. 18 and 19 are a side view and an end view respectively of the carrier in a third embodiment
Figure 18:
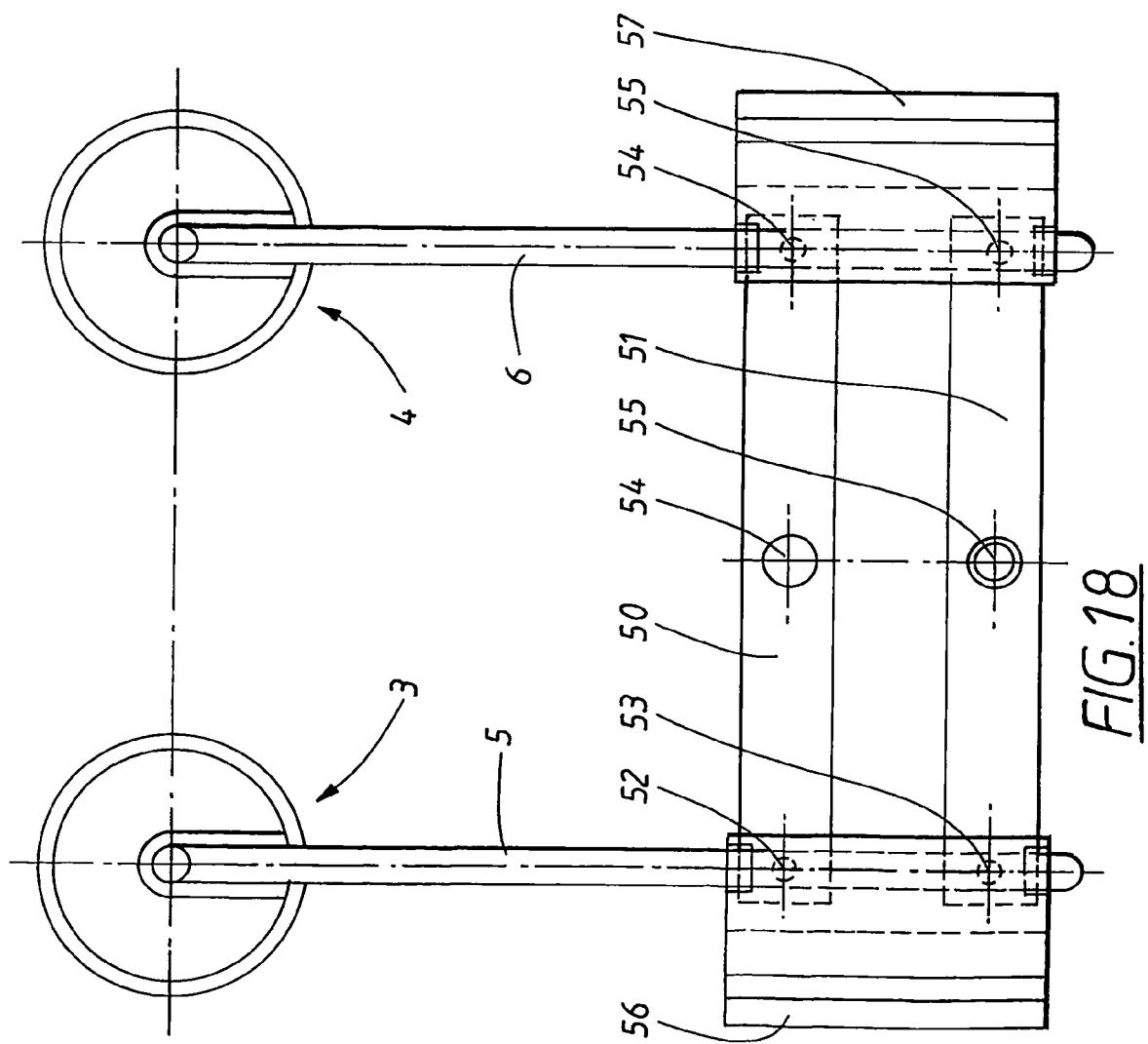

FIGS. 18 and 19 show a third embodiment of the trolley having two parallel arms 50, 51 articulated at a distance from one another along points of articulation 52, 53 54, 55 which are situated symmetrically on each carrier arm 5, 6. In this case the box-shaped holder is replaced by two buffer elements 56, 57. The parallel arms 50, 51 have two fixing holes for heavier objects.

The same function is achieved in the second and third embodiments as in the first embodiment, namely positioning of the carrier arms so that the wheel units 3, 4 maintain a largely unaltered axial distance between them regardless of the angular position between the carrier arms and the conveyor track. In both horizontal and vertical bending of the conveyors, the maintained axial distance can be automatically adjusted within a small range through torsion of the carrier arms 5, 6 about their longitudinal axes.

The invention is not limited to the examples described above, but may be modified without departing from the scope of the following claims. For example, a trolley may in principle have three or more wheel units with suspended carrier arms. Furthermore the carrier arms may have a reciprocal angle other than 0°, that is to say they may not be parallel. In the second and third embodiments a parallel rod may in principle be situated up against the wheel units. The torsional function for adjustment of the axial distance is not necessary for the basic positioning function. If the torsional function is included this may be resolved in some other way, for example by an angle joint between the upper end of the carrier arms and the axis of rotation of the wheel units.

The movement of the trolley along other sections of the roller track, such as horizontal sections and rising sections may be achieved in various ways, for example by a drive chain which drives the trolley, for example on the one wheel unit.

The invention claimed is:

1. A product carrier moveable along a conveyor track comprising a trolley including at least two wheel units designed to move along the conveyor track, a pair of carrier arms each suspended from each of said at least two wheel units, a holder pivotally supported on said pair of carrier arms, a carrier for products to be conveyed, associated with said holder, and a positioning mechanism for connecting said pair of carrier arms, so as to maintain a selected distance between said at least two wheel units regardless of the inclination of the conveyor track, said positioning mechanism comprising a plurality of toothed gear wheels rotatably supported in said holder.

2. The product carrier as claimed in claim 1, said positioning mechanism comprising a parallel guide mechanism which essentially keeps said pair of carrier arms parallel to one another regardless of the inclination of the track, so that said selective distance is substantially maintained.

3. The product carrier as claimed in claim 2, wherein said holder comprises a box in which said plurality of toothed gearwheels are rotatably supported, said plurality of toothed gearwheels comprising two outer gearwheels designed to follow the swiveling movements of said pair of carrier arms, and an intermediate gearwheel which intermeshes with said two outer gearwheels, said two outer gearwheels having the same diameter.

4. The product carrier as claimed in claim 2, wherein said parallel guide mechanism includes parallel arms articulated in said pair of carrier arms at a uniform distance.

5. The product carrier as claimed in claim 1, wherein said at least two wheel units can be turned about their axes of rotation for adjustment to curved sections of the conveyor track.

6. The product carrier as claimed in claim 5, wherein the selected distance between the at least two wheel units is variable within narrow limits.

7. The product carrier as claimed in claim 6, wherein the turning of said at least two wheel units is achieved by torsion of said pair of carrier arms about their longitudinal axes.

8. A conveyor system comprising a first conveyor, at least a second conveyor, a plurality of product carriers comprising a plurality of trolleys moveable along said conveyors for transporting products, said first conveyor comprising a continuous track, said plurality of trolleys each including at least two wheel units designed to move along said track, and said second conveyor comprising a chain conveyor including a loop of links and holding members for receiving and holding said plurality of trolleys, said holding members being spaced apart along said second conveyor by a predetermined distance, said plurality of trolleys each including a pair of carrier arms, each suspended from each of said at least two wheel units, units, a holder pivotally supported on said pair of carrier arms, and a positioning mechanism for connecting said pair of carrier arms so as to maintain a selected distance between said pair of wheel units, substantially corresponding to said predetermined distance, said positioning mechanism comprising a plurality of toothed gear wheels rotatably supported in said holder.

9. The conveyor system as claimed in claim 8, wherein said predetermined distance is variable within narrow limits in order to adjust to changes in said distance spacing apart said holding members.

\* \* \* \* \*

UNITED STATES PATENT AND TRADEMARK OFFICE
CERTIFICATE OF CORRECTION

PATENT NO. : 7,578,381 B2  Page 1 of 1
APPLICATION NO. : 10/572346
DATED : August 25, 2009
INVENTOR(S) : Mats Ingvar Davidson It is certified that error appears in the above-identified patent and that said Letters Patent is hereby corrected as shown below:

Column 2, line 11, delete "is" and insert therefor --are--.
Column 2, line 12, "provides" should read --provide--.
Column 2, lines 12-13, "facilitates" should read --facilitate--.
Column 2, line 25, "FIG." should read --FIGS--.
Column 3, line 43, "FIG." should read --FIGS--.
Column 3, line 63, "FIG." should read --FIGS--.
Column 4, line 11, "axis" should read --axes--.
Column 4, line 31, "axis" should read --axes--.
Column 7, line 33, delete ",".
Column 8, line 32, delete "units," second occurrence.

Signed and Sealed this

Fifth Day of October, 2010

David J. Kappos
*Director of the United States Patent and Trademark Office*